(12) United States Patent
Karim et al.

(10) Patent No.: US 10,480,616 B2
(45) Date of Patent: Nov. 19, 2019

(54) CRANKSHAFT DAMPER FOR AN INTERNAL COMBUSTION ENGINE

(71) Applicant: Ford Global Technologies, LLC, Dearborn, MI (US)

(72) Inventors: Ahsanul Karim, Canton, MI (US); Abdelkrim Zouani, Canton, MI (US); Michael Stanley, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 15/793,167

(22) Filed: Oct. 25, 2017

(65) Prior Publication Data
US 2019/0120323 A1    Apr. 25, 2019

(51) Int. Cl.
F16F 15/26    (2006.01)
F16F 15/28    (2006.01)
F16F 15/315   (2006.01)
F16F 15/136   (2006.01)

(52) U.S. Cl.
CPC .......... F16F 15/26 (2013.01); F16F 15/283 (2013.01); F16F 15/315 (2013.01); *F16F 15/136* (2013.01)

(58) Field of Classification Search
CPC ......... F16F 15/26; F16F 15/315; F16F 15/283
See application file for complete search history.

(56) References Cited

U.S. PATENT DOCUMENTS

| 2,346,732 | A | * | 4/1944 | Crawford | F16F 15/121 |
| | | | | | 74/574.2 |
| 2,716,904 | A | * | 9/1955 | Schuldt | F02B 75/06 |
| | | | | | 74/574.2 |
| 6,216,327 | B1 | | 4/2001 | Hendrian | |
| 6,675,759 | B2 | * | 1/2004 | Johnson | F16F 15/1201 |
| | | | | | 123/192.1 |
| 8,567,367 | B2 | | 10/2013 | Hayes et al. | |
| 10,145,444 | B2 | * | 12/2018 | Shah | F16H 55/36 |
| 2008/0110716 | A1 | | 5/2008 | Gelazin et al. | |
| 2009/0145261 | A1 | * | 6/2009 | Obeshaw | F16H 55/36 |
| | | | | | 74/574.4 |
| 2017/0314637 | A1 | * | 11/2017 | Manzoor | F16H 55/40 |

* cited by examiner

*Primary Examiner* — Kevin A Lathers
(74) *Attorney, Agent, or Firm* — Brooks Kushman P.C.; Geoffrey Brumbaugh

(57) ABSTRACT

An engine assembly has a damper rotationally coupled to a crankshaft. The damper has first and second spokes connecting a hub to an inertial weight, with the inertial weight circumferentially surrounding and spaced apart from the hub. Each of the spokes has an airfoil section. The first spoke is oriented with a positive angle of attack and the second spoke is oriented with one of a negative angle of attack and a zero angle of attack. A crankshaft damper is provided by a member having first and second spokes extending radially outwardly from a huh to an outer rim supporting an inertial weight. A chord associated with the first spoke is oriented at a first angle of attack relative to a rotational plane of the member. A chord associated with the second spoke is oriented at a second angle of attack relative to the rotational plane.

20 Claims, 6 Drawing Sheets

CRANKSHAFT DAMPER FOR AN INTERNAL COMBUSTION ENGINE

TECHNICAL FIELD

Various embodiments relate to a crankshaft damper for an internal combustion engine.

BACKGROUND

Internal combustion engines may be provided with crankshaft dampers to reduce crankshaft torsional accelerations and prevent corresponding durability and noise, vibration, and harshness (NVH) issues. During operation, the crankshaft damper may contribute to or result in increased overall engine noise.

SUMMARY

In an embodiment, an engine assembly is provided with a crankshaft, and a damper rotationally coupled to the crankshaft. The damper has first and second spokes connecting a hub to an inertial weight, with the inertial weight circumferentially surrounding and spaced apart from the hub. Each of the spokes has an airfoil section. The first spoke is oriented with a positive angle of attack and the second spoke is oriented with one of a negative angle of attack and a zero angle of attack.

In another embodiment, a crankshaft damper is provided by a member having a series of spokes extending radially outwardly from a hub to an outer rim, with the outer rim circumferentially surrounding and spaced apart from the hub and supporting an inertial weight. Each of the spokes has a chord extending between a leading edge and a trailing edge. The chord associated with a first spoke of the series of spokes is oriented at a first angle of attack relative to a rotational plane of the member. The chord associated with a second spoke of the series of spokes is oriented at a second angle of attack relative to the rotational plane of the member.

In yet another embodiment, a crankshaft damper is provided with a member having first and second spokes connecting a rim to a hub, with the rim circumferentially surrounding and spaced apart from the hub. Each of the spokes has an elongated cross-section, with the first spoke oriented at a positive angle of attack, and the second spoke oriented at one of a negative angle of attack and a zero angle of attack.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
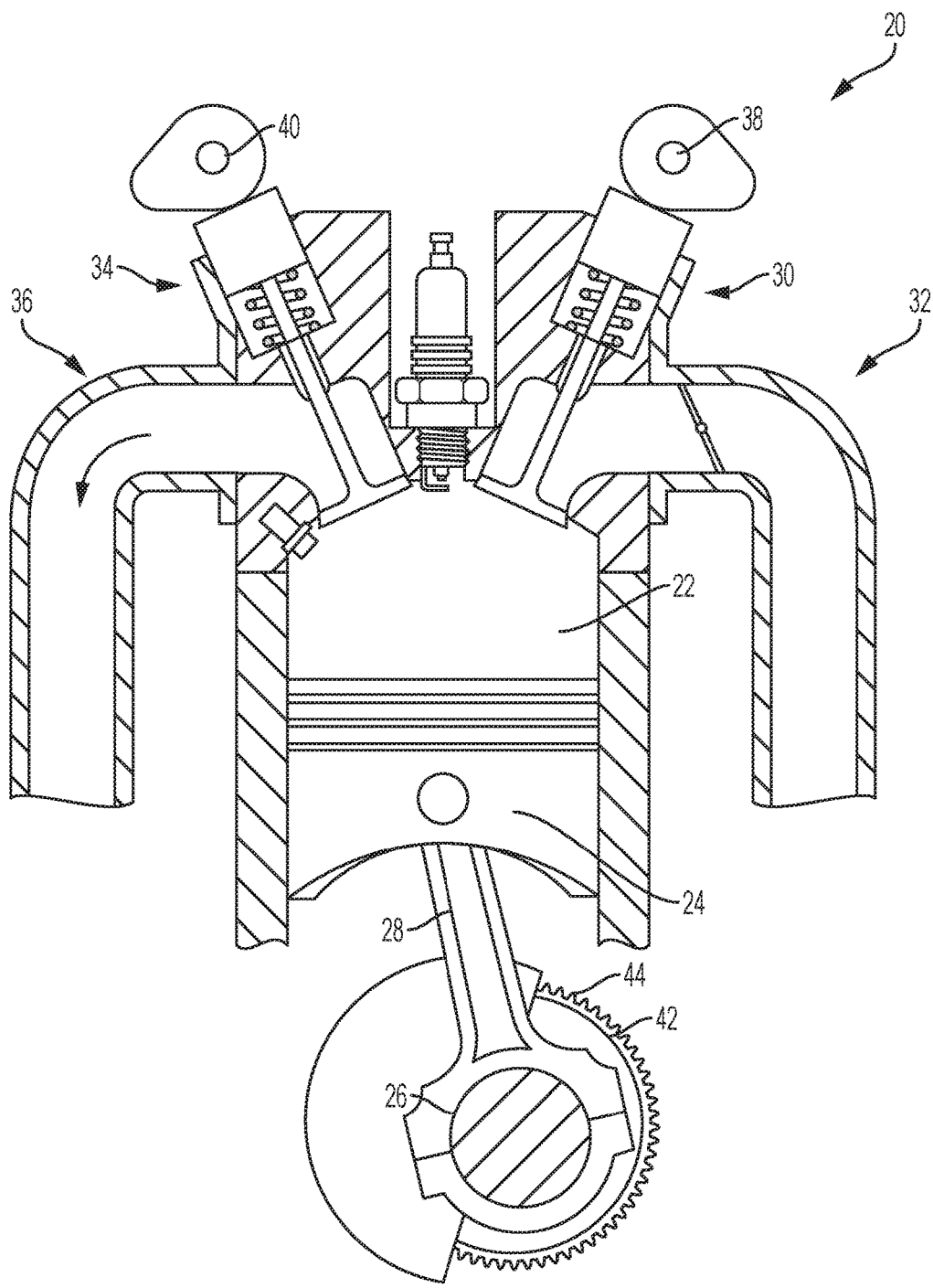
FIG. 1 illustrates a schematic of an internal combustion engine configured to implement various embodiments according to the present disclosure.

FIG. 1 illustrates a schematic of an internal combustion engine assembly 20 configured to implement various embodiments according to the present disclosure. In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

The engine 20 has a cylinder block and a cylinder head that cooperate to define a plurality of cylinders 22, with one cylinder is illustrated. The engine 20 may have one cylinder, two cylinders, three cylinders, four cylinders, or more than four cylinders. A piston 24 is positioned within each cylinder and is connected to a crankshaft 26 via a connecting rod 28.

One or more intake valves 30 controls flow from an intake manifold 32 into the cylinder 22. One or more exhaust valves 34 controls flow from the cylinder 22 to an exhaust manifold 36. The intake and exhaust valves 30, 34 may be operated in various ways as is known in the art to control the engine operation. The engine 20 is illustrated as having the intake valve 30 and exhaust valve 34 each with an associated camshaft 38, 40, respectively, in a direct overhead cam configuration. The engine and valves 30, 34 may be configured in various manners as is known in the art, for example, as a single overhead camshaft, dual overhead camshaft, direct camshaft actuation, an overhead valve configuration with the valves operated by pushrods or rockers, and the like. The camshafts 38, 40 may be rotationally connected to and driven by the crankshaft 26, and in one embodiment, are driven by a gear train according to the present disclosure as described below.

Each cylinder 22 may operate under a four-stroke cycle including an intake stroke, a compression stroke, an ignition stroke, and an exhaust stroke. In other embodiments, the engine may operate with a two stroke cycle. The piston 24 position at the top of the cylinder 22 is generally known as top dead center (TDC). The piston 24 position at the bottom of the cylinder is generally known as bottom dead center (BDC).

During the intake stroke, the intake valve(s) 30 opens and the exhaust valve(s) 30 closes while the piston 24 moves from the top of the cylinder 22 to the bottom of the cylinder 22 to introduce air from the intake manifold to the combustion chamber.

During the compression stroke, the intake and exhaust valves 30, 34 are closed. The piston 24 moves from the bottom towards the top of the cylinder 22 to compress the air within the combustion chamber.

Fuel is then introduced into the combustion chamber and ignited. The engine may be provided as a spark ignition engine or as a compression ignition engine, such as a diesel engine. During the expansion stroke, the ignited fuel air mixture in the combustion chamber expands, thereby causing the piston 24 to move from the top of the cylinder 22 to the bottom of the cylinder 22. The movement of the piston 24 causes a corresponding movement in crankshaft 26 and provides for a mechanical torque output from the engine 20.

During the exhaust stroke, the intake valve(s) 30 remains closed, and the exhaust valve(s) 34 opens. The piston 24 moves from the bottom of the cylinder to the top of the cylinder 22 to remove the exhaust gases and combustion products from the combustion chamber by reducing the volume of the chamber. The exhaust gases flow from the combustion cylinder 22 to the exhaust manifold 36.

The intake and exhaust valves 30, 34 positions and timing, as well as the fuel injection timing and ignition timing may be varied for the various engine strokes.

The crankshaft 26 may be provided with a crankshaft damper 42, for example, to reduce the crankshaft angular fluctuations created by the combustion and piston inertia torques. The crankshaft damper 42 may also be known as a harmonic damper or a torsional damper. The crankshaft damper 42 is connected for rotation with the crankshaft 26, for example, at a free or accessory drive end of the crankshaft In one example, the damper 42 is interference fit to the crankshaft. The crankshaft damper 42 may additionally be provided or act as an accessory drive pulley, and be provided with gearing 44 having timing marks.

Figure 2:
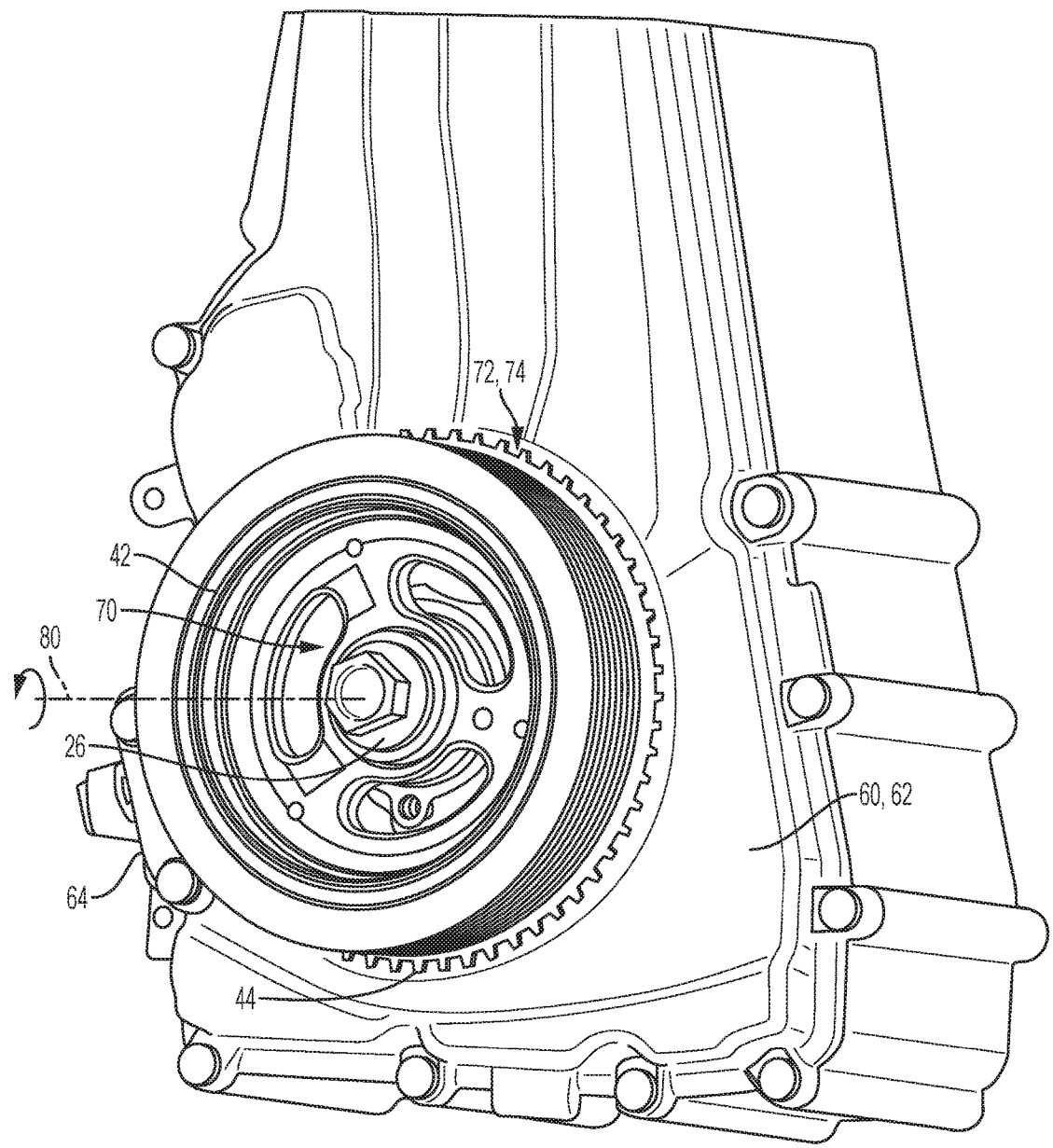
FIG. 2 illustrates a partial perspective view of an engine assembly including an engine cover, and a crankshaft and crankshaft damper of the engine of FIG. 1.

The block 50 and the cylinder head 52 of the engine 20 may be at least partially enclosed in an engine cover, as illustrated in FIG. 2, described below.

FIG. 2 illustrates partial perspective view of a crankshaft damper 42 mounted on a crankshaft 26 with the block 50 and the head 52 of the engine enclosed within a cover 60. The cover 60 may include one or more cover elements that cooperate to enclose the engine. The cover 60 may be provided with a front cover 62. The front cover 62 is located on the accessory end of the crankshaft. 26, or opposed to the flywheel mounting flange or drive end of the crankshaft. The front cover 62 defines an aperture therethrough. The accessory end of the crankshaft passes through the aperture in the front cover such that the cover 62 is positioned between the damper 42 and the block 50 of the engine 20. Various sensors may be provided and mounted on the cover 60, such as a speed sensor 64 as shown.

The crankshaft damper 42 is used to reduce crankshaft torsional accelerations and. reduce or prevent corresponding durability and noise, vibration and harshness (NVH) issues. During operation, the rotation of the crankshaft damper may create flow noise radiated from the peripheral region of the damper, which may contribute to overall engine noise, and may drive the overall engine noise to an objectionable level. Noise measurements were conducted using acoustic holography, and the periphery of the damper showed an increased radiation of noise in that region.

A crankshaft damper 42 according to the present disclosure provides for reduced noise during operation, thereby reducing overall engine noise.

During engine operation, the crankshaft damper 42 rotates with the crankshaft 26, and the rotational motion of the damper 42 causes adjacent air to move, or induces air flow. Computational fluid dynamics analyses were conducted on the crankshaft damper 42 as well as a conventional crankshaft damper.

An aero-acoustic analysis indicates that the spinning of a conventional crankshaft damper causes air surrounding the crankshaft damper, e.g. on the outer face of the damper, to be drawn into the apertures or regions 70 between adjacent spokes and into a narrow gap 72 or spacing between the inner face of the crankshaft damper and the front cover 62. In one example, the narrow gap 72 is is in a size range of 2.5 millimeters to 10 millimeters. As the air flow between the inner face of the damper and the front cover 62 flows radially outward and past the peripheral edge 74 of the damper, it expands and causes an increase in the sound pressure level and contributes to increased engine noise. A conventional crankshaft damper, or a crankshaft damper is provided with all of the spokes extending in or defined by the rotational plane of the damper. In conventional systems, noise reduction has been. attempted by blocking the apertures, for example, using foam blocks; however, this approach adds complexity in terms of both manufacturing and retention of the plug over the lifespan of the engine, increased costs, and other issues. Other conventional crankshaft dampers may be provided as a solid disc without apertures; however, while this reduces flow noise from the damper, this design has increased weight and results in additional noise due to vibrations transmitted from the crankshaft.

The damper 42 according to the present disclosure is designed to approach or provide a neutral air flow, or net zero air flow, across the damper and through the apertures 70 between the spokes to reduce the amount of air flow flowing through the gap 72. The damper 42 as shown in FIG. 2 rotates in a counterclockwise direction about a rotational axis 80 during operation of the engine 20, with the rotational axis 80 intersecting and lying perpendicular to the rotational plane of the damper 42.

FIGS. 3-6 illustrate an embodiment of a crankshaft damper 42 according to an embodiment and for use with the engine 20 and assembly of FIGS. 1-2. Elements in FIGS. 3-6 are given the same reference numbers as similar elements in FIGS. 1-2 for simplicity.

The crankshaft damper 42 is defined by a member 100. The member 100 has a hub 102. The hub 102 defines a central aperture 104 or bore 104 that is sized to receive a portion of a crankshaft 26.

The member 100 also has an outer rim 106. The outer rim 106 is provided by an annular shell and extends circumferentially about the hub 102. The outer rim 106 is spaced apart from the hub 102 as shown, and is concentric with the hub 102 about the rotational axis 80.

The outer rim 106 supports an inertial weight 108 that also circumferentially surrounds and is spaced apart from the hub 102. The weight 108 may be connected to the outer rim 106 via an elastomeric element. In the example shown, the inertial weight 108 is symmetric about the hub 102. In other examples, the weight may be provided as a counterweight element for the damper. An outer peripheral edge 110 of the inertial weight provides an outer peripheral edge of the damper, and may be provided with a profile to act as a pulley or drive other components such as front end accessories.

The damper has a first, inner face 112 that is directly adjacent to the cover 60, 62 when installed in an engine assembly, and a second outer face 114 opposed to the inner face.

The damper 42 has a series of spokes 120 connecting the hub 102 to the outer rim 106 and the inertial weight 108. In FIGS. 3-6, the damper 42 is shown as having three spokes 120, or a first, second, and third spoke 122, 124, 126. In other examples, the damper may have other numbers of spokes 120, such as fewer than three spokes or more than three spokes. Each of the spokes 120 extend radially outwardly from the hub 102 towards the rim 106 and weight 108 and define apertures 70 therebetween. The spokes 120 may be equally spaced from one another about the hub 102 as shown, or in other examples, may be provided with variable spacing about the hub 102.

In various embodiment, the spokes 120 of a crankshaft damper 42 are provided with airfoil sections and varying angles of attack to provide aero-dynamic shapes to reduce the amount of air flow across the damper and flowing through a narrow gap between the crankshaft damper and the engine front cover. The damper 42 not only reduces the amount of air flow through the gap 72 between the damper and the engine front cover, but also prevents an increase or reduces net air flow in front of the damper, or on the outer face 114 side of the damper.

Figures 4, 5:
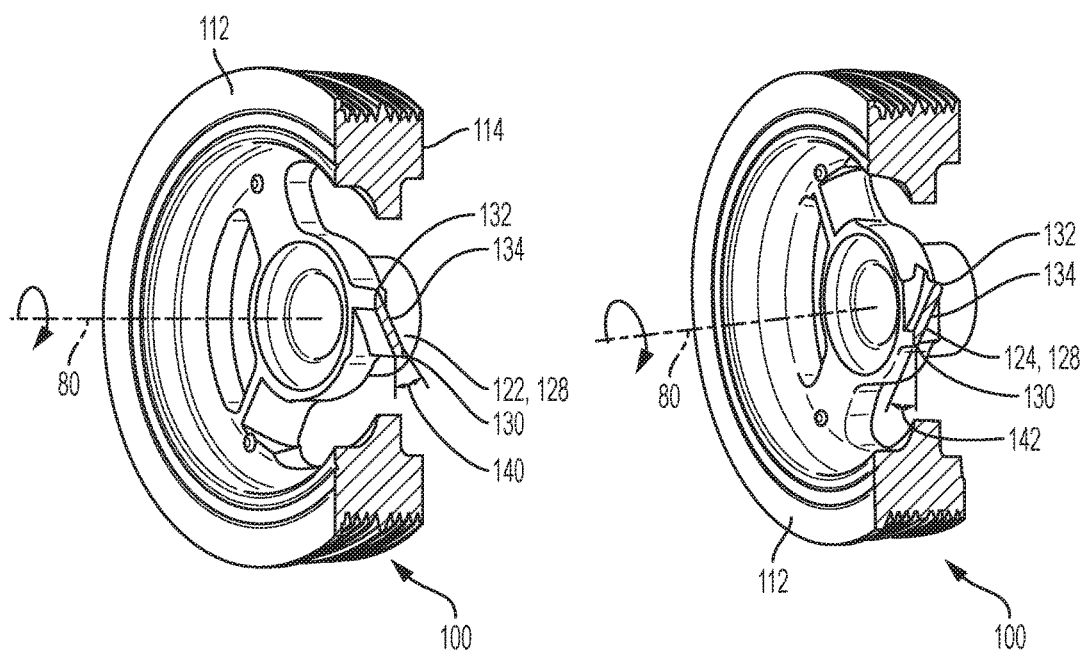
FIG. 4 illustrates a sectional view of the crankshaft damper of FIG. 3.
FIG. 5 illustrates another sectional view of the crankshaft damper of FIG. 3.
Figure 6:
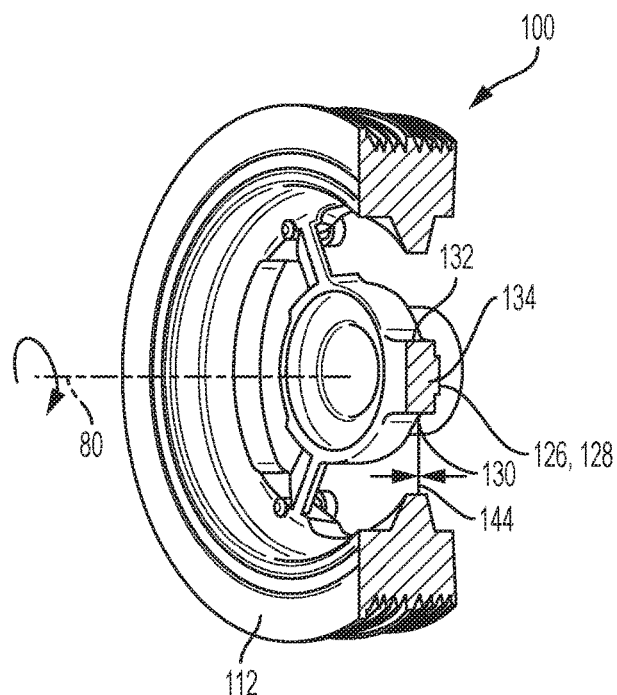
FIG. 6 illustrates yet another sectional view of the crankshaft damper of FIG. 3.

Each of the spokes 120 has an airfoil section 128 as shown in FIGS. 4-6. The airfoil sections 128 of each of the spokes 120 may be the same as one another or may be different than one another. An airfoil section 128 according to the present disclosure encompasses both a traditional airfoil section as well as a flat plate. Each of the spokes 120 has an elongated cross section that provides the airfoil section 128, and that extends from a leading edge 130 to a trailing edge 132 of each spoke 120. A chord 134 is defined for each spoke 120, with the chord 134 extending from the leading edge 130 to the trailing edge 132.

Each spoke 120 may have the same airfoil section 128 along the length of the spoke 120 in the radial direction, or the airfoil section 128 may change in shape, size, or angle of attack along the length of the spoke such that a spoke has a different airfoil section at different radial positions along the spoke.

In the example shown, the crankshaft damper 42 has at least one spoke 122 oriented with a first angle of attack 140, or a positive angle of attack 140. FIG. 4 illustrates a sectional view of the first spoke 122 of the damper 42 with a positive angle of attack 140. The crankshaft damper also has at least one spoke 124, 126 with a second angle of attack, or a negative or zero angle of attack. FIG. 5 illustrates a sectional view of the second spoke 124 of the damper with a negative angle of attack 142. FIG. 6 illustrates a sectional view of the third spoke 126 of the damper with a zero angle of attack 144 such that the chord 134 lies parallel with or co-planar with the rotational plane of the member 100. The angle of attack 140, 142, 144 for each spoke 120 is taken in a direction of movement of the spoke based on the rotational direction of the damper 42 and is taken based on the chord 134 of the spoke and the rotational plane of the damper 42.

The leading edge 130 of a spoke 124, 126 with a negative or zero angle of attack 142, 144 is positioned between the engine cover and a leading edge 130 of a spoke 122 with a positive angle of attack 140, or between the inner face 112 of the damper and the leading edge 130 of a spoke 122 with a positive angle of attack 140.

In one example, the positive angle of attack 140 lies in the range of 10-45 degrees, and the negative angle of attack 142 lies in the range of 5-45 degrees or 10-45 degrees, although other ranges for each are also contemplated. The zero angle of attack 144 may be a zero value, or may be substantially zero, e.g. being within 5 degrees of zero.

The spokes 120 act to deflect airflow and control air flow during rotation of the crankshaft damper 42. The spokes 122 with a positive angle of attack 140 act to draw air flow towards the apertures 70 and the gap 72 and pump air towards the cover. The spokes 124 with a negative angle of attack 142 draw air flow away from the apertures 70 and the gap 72 by pumping air away from the cover. Spokes 126 with a zero angle of attack 144 generally contribute to drawing air towards the apertures 70 and gap 72, but to a lesser extent than the positively oriented spokes.

The number of each of the positively angled spokes 122 and negatively or zero angled spokes 124, 126, and the angle of attack and shape and size of each of the spokes 120 may be selected and controlled to provide a neutral or near neutral air flow across the damper and reduce overall noise for the damper and engine.

Figure 3:
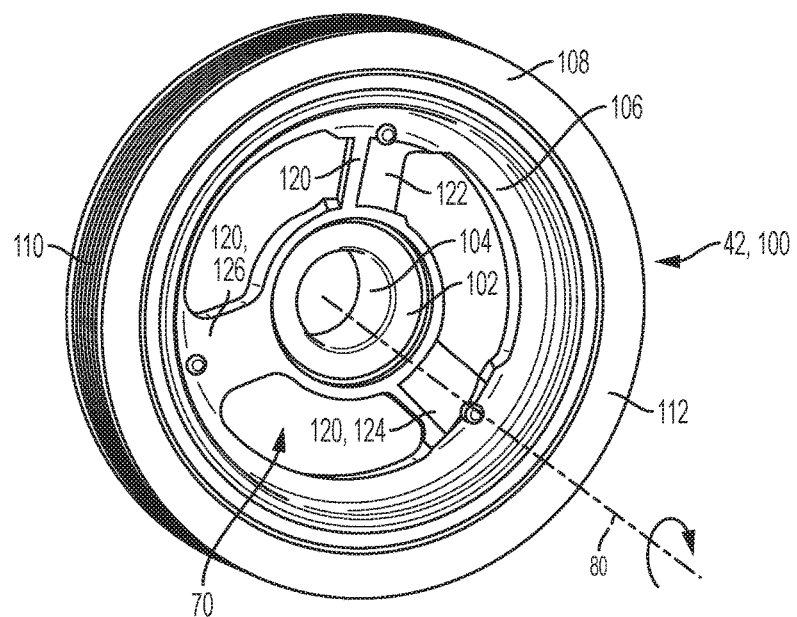
FIG. 3 illustrates a perspective view of a crankshaft damper according to an embodiment.
Figure 7:
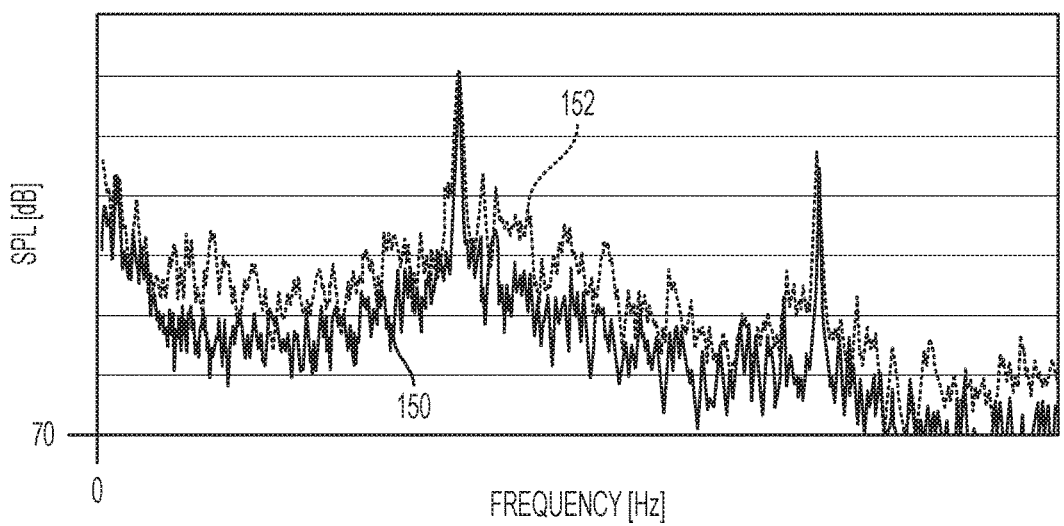
FIG. 7 is a graph providing sound pressure level versus frequency for the crankshaft damper of FIG. 3 in comparison with a conventional crankshaft damper.

FIG. 7 is a graph based on computational models with sound pressure level in decibels (dB) with varying pressure spectra in Hertz (Hz) at the damper 42 inner periphery for an engine operating at 3000 revolutions per minute. The sound pressure level for a damper 42 according to FIG. 3 is illustrated by line 150. The sound pressure level for a conventional damper with all of the spokes having a zero angle of attack, or lying in the rotational plane of the damper, is shown by line 152. The damper 42 according to the present disclosure consistently provides a reduced sound pressure level, or provides a broadband sound reduction. Furthermore, the damper 42 provides a significant 5 dB reduction over the conventional damper when integrated across a critical frequency range of the noise, or from 1000 Hz-2000 Hz.

Figure 8:
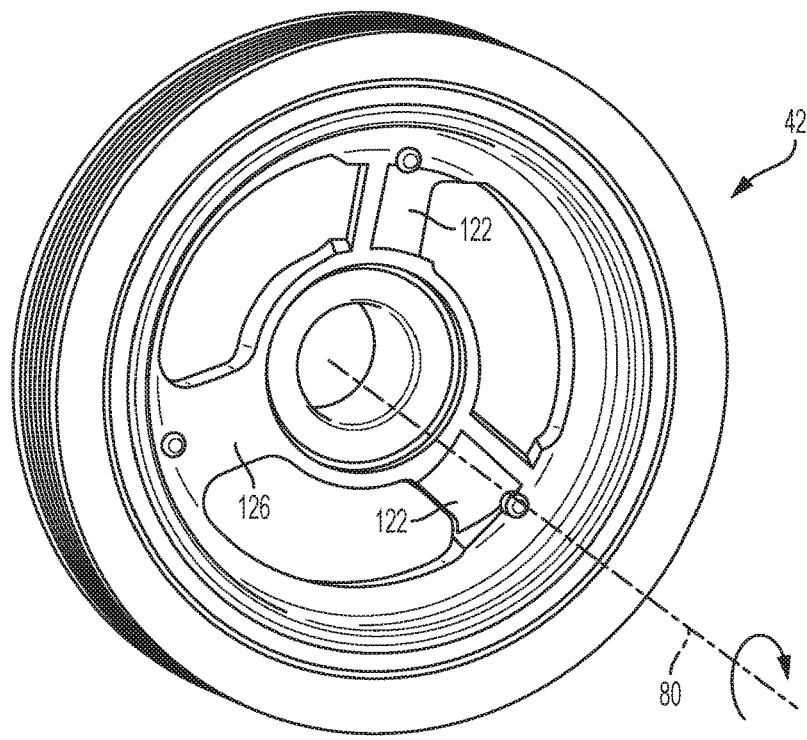
FIG. 8 illustrates a perspective view of a crankshaft damper according to another embodiment.
Figure 9:
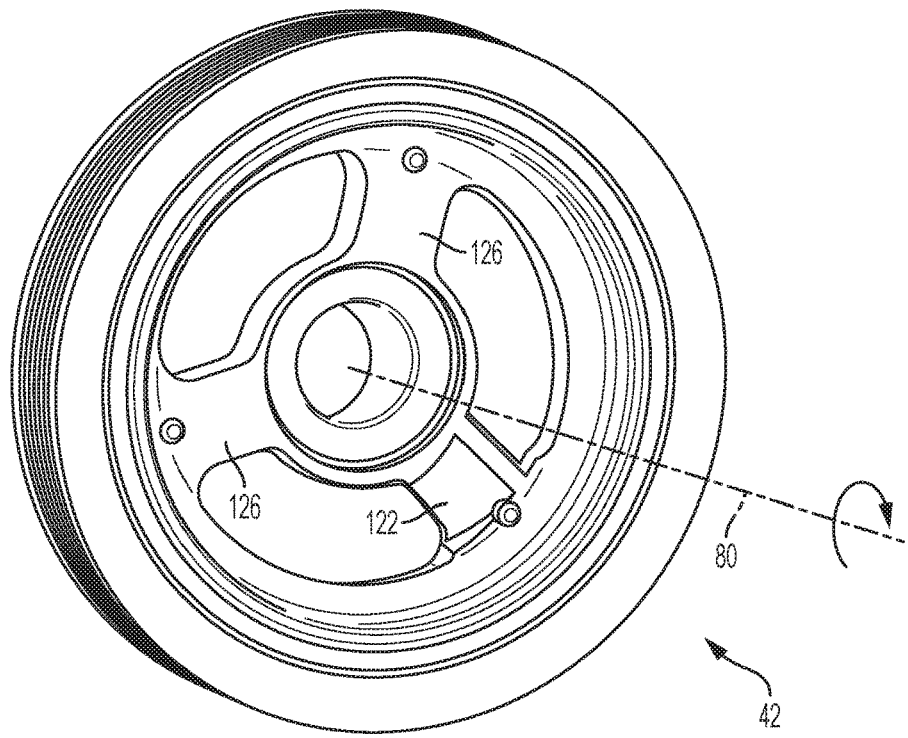
FIG. 9 illustrates a perspective view of a crankshaft damper according to yet another embodiment.
Figure 10:
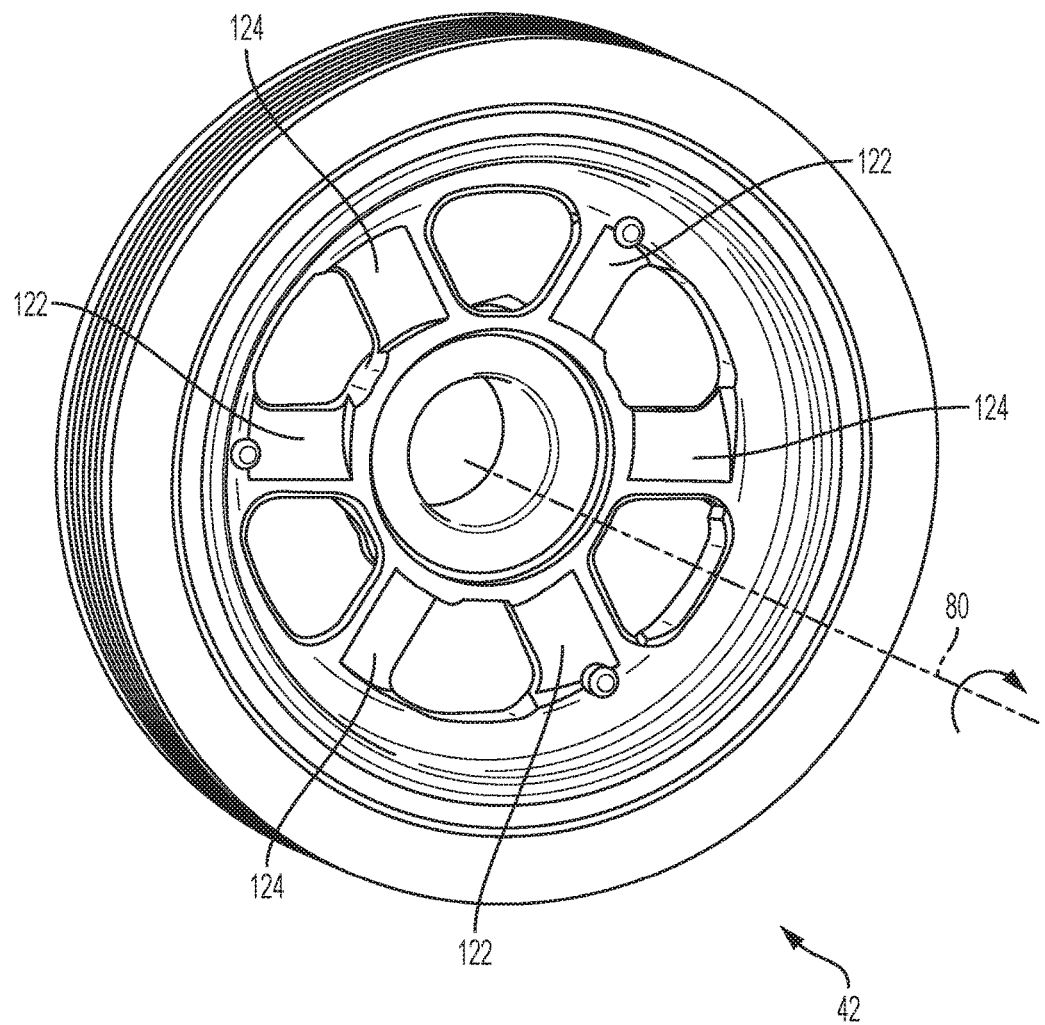
FIG. 10 illustrates a perspective view of a crankshaft damper according to another embodiment.

FIGS. 8, 9, and 10 illustrate other embodiments for a crankshaft damper 42 according to the present disclosure. Elements in FIGS. 8-10 are given the same reference numbers as similar elements in FIGS. 1-6 for simplicity.

FIG. 8 illustrates a crankshaft damper 42 according to the present disclosure with a first spoke provided as a positively oriented spoke 122 and oriented with a positive angle of attack 140, a second spoke provided as a positively oriented spoke 122 and oriented with a positive angle of attack 140, and a third spoke provided as a non-oriented spoke 126 and oriented with a zero or near zero angle of attack 144.

FIG. 9 illustrates a crankshaft damper according to the present disclosure with a first spoke provided as a positively oriented spoke 122 and oriented with a positive angle of attack 140, a second spoke provided as a non-oriented spoke 126 and oriented with a zero or near zero angle of attack 144, and a third spoke provided as a non-oriented spoke 126 and oriented with a zero or near zero angle of attack 144.

FIG. 10 illustrates a crankshaft damper according to the present disclosure with the damper having six spokes. Three of the spokes are provided as positively oriented spokes 122 and oriented with a positive angle of attack 140, and the other three spokes are provided as negatively oriented spokes 124 and oriented with a negative angle of attack 142. The positively and negatively oriented spokes are arranged to alternate with one another about the damper.

Depending on the engine 20 requirements and operating conditions, various configurations and orientations of spokes may be provided. For example, the number of the positively oriented spokes 122, or spokes with a positive angle of attack, may be varied with each damper having at least one positively angled spoke.

The number of the negatively oriented spokes 124, or spokes with a negative angle of attack, and non-oriented spokes 126, or spokes with a zero or near zero angle of attack, may also be varied relative to one another and for the damper, with a damper having at least one negatively angled or non-oriented spoke 124, 126. The positively and negatively and/or non-oriented spokes 122, 124, 126 may be arranged sequentially in various orders relative to one another.

For multiple positively angled spokes 122, each may be provided at a different positive angle of attack or they may all be provided at the same positive angle of attack as shown in FIG. 10. Likewise, for multiple negatively angled spokes, each may be provided at a different negative angle of attack or they may all be provided at the same negative angle of attack as shown in FIG. 10. Each of the spokes may have the same airfoil section, or shape, area, and/or geometry, or may have differing airfoil sections or differing shapes, areas, and/or geometries.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine assembly comprising:
  a crankshaft; and
  a damper rotationally coupled to the crankshaft and having first and second spokes connecting a hub to an inertial weight, the inertial weight circumferentially surrounding and spaced apart from the hub, each of the spokes having an airfoil section, the first spoke oriented with a positive angle of attack and the second spoke oriented with one of a negative angle of attack and a zero angle of attack.

2. The engine assembly of claim 1 further comprising an engine cover configured to at least partially surround an engine block, the crankshaft extending through the cover such that the cover is positioned between the block and the damper.

3. The engine assembly of claim 2 wherein a leading edge of the second spoke is positioned between a leading edge of the first spoke and the engine cover.

4. The engine assembly of claim 1 wherein the first and second spoke are configured to control air flow to be neutral across the damper.

5. The engine assembly of claim 1 wherein the second spoke is oriented with the negative angle of attack; and
  wherein the damper has a third spoke connecting the hub to the inertial weight, the third spoke hawing the airfoil section and oriented with a zero angle of attack.

6. A crankshaft damper comprising:
  a member having a series of spokes extending radially outwardly from a hub to an outer rim, the outer rim circumferentially surrounding and spaced apart from the hub and supporting an inertial weight, each of the spokes having a chord extending between a leading edge and a trailing edge, the chord associated with a first spoke of the series of spokes being oriented at a first angle of attack relative to a rotational plane of the member, the chord associated with a second spoke of the series of spokes being oriented at a second angle of attack relative to the rotational plane of the member.

7. The crankshaft damper of claim 6 wherein the first angle of attack is a positive value; and
  wherein the second angle of attack is one of a negative value and zero.

8. The crankshaft damper of claim 6 Wherein the first angle of attack is a positive value;
  wherein the second angle of attack is a negative value; and
  wherein the chord associated with a third spoke of the series of spokes is oriented at a third angle of attack relative to the rotational plane of the member, the third angle of attack being zero.

9. A crankshaft damper comprising:
  a member having first and second spokes connecting a rim to a hub, the rim circumferentially surrounding and spaced apart from the hub, each of the spokes having an elongated cross-section, the first spoke oriented at a positive angle of attack, the second spoke oriented at one of a negative angle of attack and a zero angle of attack.

10. The crankshaft damper of claim 9 wherein each of the spokes has the elongated cross-section extending from a leading edge of the spoke to a trailing edge of the spoke, a chord defined between the leading and trailing edges.

11. The crankshaft damper of claim 10 wherein the angle of attack for each spoke is taken between a rotational plane of the member and the associated chord of the spoke.

12. The crankshaft damper of claim 9 wherein the elongated cross-section of each of the spokes is formed as an airfoil section.

13. The crankshaft damper of claim 9 Wherein the second spoke is oriented at the negative angle of attack; and
  wherein the member has a third spoke connecting the rim to the hub, the third spoke having an elongated cross-section and oriented at a zero angle of attack.

14. The crankshaft damper of claim 13 wherein a chord of the third spoke is parallel with a rotational plane of the member such that the third spoke is oriented at the zero angle of attack.

15. The crankshaft damper of claim 13 wherein the first, second, and third spokes are equally spaced from one another about the hub; and
  wherein each of the spokes extends radially outwardly from the hub to the rim.

16. The crankshaft damper of claim 9 Wherein the second spoke is oriented at the zero angle of attack; and
  wherein the member has a third spoke connecting the rim to the hub, the third spoke having an elongated cross-section and oriented at a zero angle of attack.

17. The crankshaft damper of claim 9 wherein the hub defines a central aperture sized to receive an end portion of a crankshaft.

18. The crankshaft damper of claim 9 wherein the positive angle of attack is relative to a rotational plane and a rotational direction of the member.

19. The crankshaft damper of claim 9 wherein the positive angle of attack is within 5-45 degrees of a rotational plane of the member;
  wherein the negative angle of attack is within 5-45 degrees of the rotational plane; and
  wherein the zero angle of attack is within 5 degrees of the rotational plane.

20. The crankshaft damper of claim 9 wherein the rim supports an inertial weight.

* * * * *